US 8,045,845 B2

(12) United States Patent  
Braun et al.

(10) Patent No.: US 8,045,845 B2  
(45) Date of Patent: Oct. 25, 2011

(54) SYSTEM FOR HOLDING A CURRENT TRACK DURING PLAYBACK OF A MULTI-TRACK MEDIA PRODUCTION

(75) Inventors: Jeffrey Braun, Orinda, CA (US); Zane Vella, San Francisco, CA (US); Joseph Rice, Oakland, CA (US); Ole Lütjens, San Francisco, CA (US)

(73) Assignee: Hollinbeck Mgmt. GmbH, LLC, Wilmington, DE (US)

( * ) Notice: Subject to any disclaimer, the term of this patent is extended or adjusted under 35 U.S.C. 154(b) by 1265 days.

(21) Appl. No.: 11/029,028

(22) Filed: Jan. 3, 2005

(65) Prior Publication Data

US 2006/0150100 A1   Jul. 6, 2006

(51) Int. Cl.
- H04N 5/93 (2006.01)
- H04N 5/76 (2006.01)
- H04N 5/84 (2006.01)
- H04N 5/77 (2006.01)

(52) U.S. Cl. ......... 386/353; 386/341; 386/344; 386/223
(58) Field of Classification Search .................. None
See application file for complete search history.

(56) References Cited

U.S. PATENT DOCUMENTS

| | | | |
|---|---|---|---|
| 4,975,771 A | 12/1990 | Kassatly | |
| 4,992,866 A * | 2/1991 | Morgan | 348/159 |
| 5,404,295 A | 4/1995 | Katz et al. | |
| 5,734,862 A | 3/1998 | Kulas | |
| 5,850,545 A | 12/1998 | Matsushita | |
| 5,895,124 A | 4/1999 | Tsuga et al. | |
| 5,913,010 A | 6/1999 | Kaneshige et al. | |
| 5,923,627 A * | 7/1999 | Miwa et al. | 386/70 |

(Continued)

FOREIGN PATENT DOCUMENTS

EP   0 785 675   7/1997

(Continued)

OTHER PUBLICATIONS

Bargeron, et al. "Annotations for Streaming Video on the Web", CHI '99 Extended Abstracts on Human Factors in Computing Systems, ACM Press, published 1999, pp. 278-279.

*Primary Examiner* — Thai Tran  
*Assistant Examiner* — Gelek W Topgyal  
(74) *Attorney, Agent, or Firm* — Knobbe, Martens, Olson & Bear LLP

(57) ABSTRACT

A "hold" feature on a user operated remote control allows a currently displayed track or view to be maintained while a video presentation is being played. As a user is watching a presentation that uses multiple camera views shown one-at-a-time as in a standard edited cut (i.e., "director's cut") of a movie, the user can press a button when the user sees a camera view or scene of particular interest. Thereafter, the track associated with the camera view or scene that was showing when the hold button was pressed will continue to be played in place of the presentation. To return to the edited cut the user depresses the hold button again. The held track will continue to play until the user decides to resume presentation of the edited program or until the held track ends. Upon ending, the program track is resumed. While holding a track the user is free to select other available tracks in addition to jumping back to the program track at any time.

20 Claims, 3 Drawing Sheets

U.S. PATENT DOCUMENTS

| | | | |
|---|---|---|---|
| 5,929,857 A | 7/1999 | Dinallo et al. | |
| 5,963,256 A | 10/1999 | Tahara | |
| 5,999,698 A | 12/1999 | Nakai et al. | |
| 6,002,995 A * | 12/1999 | Suzuki et al. | 702/188 |
| 6,006,241 A | 12/1999 | Purnaveja et al. | |
| 6,085,185 A | 7/2000 | Matsuzawa et al. | |
| 6,088,506 A | 7/2000 | Yoshio et al. | |
| 6,105,063 A | 8/2000 | Hayes, Jr. | |
| 6,144,375 A * | 11/2000 | Jain et al. | 715/251 |
| 6,173,287 B1 | 1/2001 | Eberman et al. | |
| 6,173,317 B1 | 1/2001 | Chaddha et al. | |
| 6,175,595 B1 | 1/2001 | Keesman | |
| 6,245,982 B1 | 6/2001 | Suzuki et al. | |
| 6,246,401 B1 | 6/2001 | Setogawa et al. | |
| 6,256,453 B1 | 7/2001 | Takano | |
| 6,263,346 B1 | 7/2001 | Rodriquez | |
| 6,289,165 B1 * | 9/2001 | Abecassis | 386/46 |
| 6,307,550 B1 | 10/2001 | Chen et al. | |
| 6,332,144 B1 | 12/2001 | deVries et al. | |
| 6,404,925 B1 | 6/2002 | Foote et al. | |
| 6,415,101 B1 * | 7/2002 | deCarmo et al. | 386/219 |
| 6,430,361 B2 | 8/2002 | Lee | |
| 6,430,609 B1 | 8/2002 | Dewhurst et al. | |
| 6,434,097 B1 * | 8/2002 | Lewis et al. | 369/47.11 |
| 6,449,653 B2 | 9/2002 | Klemets et al. | |
| 6,453,459 B1 | 9/2002 | Brodersen et al. | |
| 6,467,080 B1 | 10/2002 | Devine et al. | |
| 6,477,315 B1 | 11/2002 | Ohomori | |
| 6,483,983 B1 * | 11/2002 | Takahashi et al. | 386/46 |
| 6,501,770 B2 | 12/2002 | Arsenault et al. | |
| 6,546,405 B2 | 4/2003 | Gupta et al. | |
| 6,687,211 B2 | 2/2004 | Sawabe et al. | |
| 6,708,334 B1 * | 3/2004 | deCarmo et al. | 718/106 |
| 6,731,185 B2 | 5/2004 | Taniguchi | |
| 6,789,109 B2 | 9/2004 | Samra et al. | |
| 6,806,885 B1 | 10/2004 | Piper et al. | |
| 6,898,799 B1 | 5/2005 | Jarman | |
| 6,954,419 B1 | 10/2005 | Kimura et al. | |
| 6,954,581 B2 | 10/2005 | Miller et al. | |
| 6,965,723 B1 | 11/2005 | Abe et al. | |
| 6,985,188 B1 | 1/2006 | Hurst, Jr. | |
| 7,009,658 B2 * | 3/2006 | Kim | 348/553 |
| 7,061,930 B2 | 6/2006 | Mizobata | |
| 7,079,752 B1 | 7/2006 | Leyendecker | |
| 7,151,214 B2 | 12/2006 | Barry | |
| 7,161,079 B2 | 1/2007 | Nishitani et al. | |
| 7,334,026 B2 | 2/2008 | Samra et al. | |
| 7,565,060 B2 * | 7/2009 | Hamada et al. | 386/98 |
| 2001/0033736 A1 | 10/2001 | Yap et al. | |
| 2002/0032768 A1 | 3/2002 | Voskuil | |
| 2002/0092021 A1 | 7/2002 | Yap et al. | |
| 2003/0191776 A1 | 10/2003 | Obrador | |
| 2003/0236581 A1 | 12/2003 | Chambers et al. | |
| 2004/0073930 A1 | 4/2004 | Demas et al. | |
| 2004/0078215 A1 | 4/2004 | Dahlin et al. | |
| 2004/0107439 A1 | 6/2004 | Hassell et al. | |
| 2004/0181592 A1 | 9/2004 | Samra et al. | |
| 2004/0184768 A1 | 9/2004 | Seo et al. | |
| 2004/0201544 A1 | 10/2004 | Love et al. | |
| 2005/0111829 A1 * | 5/2005 | Ito et al. | 386/69 |
| 2005/0234958 A1 | 10/2005 | Sipusic et al. | |
| 2005/0262542 A1 | 11/2005 | DeWeese et al. | |
| 2007/0067297 A1 * | 3/2007 | Kublickis | 707/9 |

FOREIGN PATENT DOCUMENTS

| | | |
|---|---|---|
| JP | 07210174 | 8/1995 |

* cited by examiner

| entry | time | track |
|---|---|---|
| 1 | 0:00.0 | A |
| 2 | 0:08.0 | B |
| 3 | 0:10.5 | C |
| 4 | 0:13.5 | B |
| 5 | 0:15.8 | C |
| 6 | 0:20.0 | A |
| 7 | 0:22.2 | C |
| 8 | 0:26.0 | B |
| 9 | 0:29.5 | |

… etc.), from a compact disk (CD), a digital versatile disk (DVD), memory stick, hard disk or other suitable storage medium, or from other sources. Some forms of media presentations allow a user to select an angle or scene from one of multiple angles or scenes (or other information) available during the presentation. For example, if a user is watching a broadcast of a football game the user may be able to select a camera view that shows a close-up of the quarterback, a medium shot of a team's linemen, a long overhead shot of the playing field, etc. The user can select among each of the available scenes at any time by pressing buttons on a remote control device.

SYSTEM FOR HOLDING A CURRENT TRACK DURING PLAYBACK OF A MULTI-TRACK MEDIA PRODUCTION

CROSS-REFERENCES TO RELATED APPLICATIONS

This application is related to co-pending U.S. patent application Ser. No. 10/636,507 filed Aug. 6, 2003, which is hereby incorporated by reference as if set forth in full in this application for all purposes.

BACKGROUND OF THE INVENTION

This invention relates in general to viewing a media production and more specifically to providing user ability to hold, or maintain individual video tracks during the playback of a video.

Media productions can be presented to a user, or viewer, from many sources. Productions such as audiovisual videos, movies, etc., can originate from broadcast centers, satellite transmissions, cable transmissions, digital networks (e.g., the Internet, a corporate or campus local area network (LAN), etc.), from a compact disk (CD), a digital versatile disk (DVD), memory stick, hard disk or other suitable storage medium, or from other sources. Some forms of media presentations allow a user to select an angle or scene from one of multiple angles or scenes (or other information) available during the presentation. For example, if a user is watching a broadcast of a football game the user may be able to select a camera view that shows a close-up of the quarterback, a medium shot of a team's linemen, a long overhead shot of the playing field, etc. The user can select among each of the available scenes at any time by pressing buttons on a remote control device.

Similarly, a DVD, hard disk drive, random access memory (RAM), streaming content over a network or other content source can provide a production with multiple track, or "multi-angle," selection. Typically, each selectable angle or view is assigned to a different button. Alternatively, a display screen dan show icons, symbols, "thumbnail" images or other indicators of possible scene selections. The user can highlight and select a track associated with an indicator by using a control such as a television remote control.

However, the use of dedicated buttons, separate visual indicators for each track, or other prior art approaches to track selection can create inconveniences during playback. For example, it may be difficult for a user to remember which button is associated with a track. Where an on-screen visual indicator is used, valuable screen "real estate" is taken up and less viewable area is available for displaying the actual presentation. A user may be required to interpret the visual indicators to understand what type of angle or scene selection will result from selecting a particular track. Track assignments and availability often change during a presentation and this can disorient and confuse the user.

SUMMARY OF THE INVENTION

One embodiment of the invention allows a user to select or "hold" a currently displayed track or view while a presentation is being played. As a user is watching a presentation that uses multiple camera views shown one-at-a-time as in a standard edited cut (i.e., "director's cut") of a movie, when the user sees a camera view of particular interest, the user can press a "hold" button. Thereafter, the track associated with the camera view or scene that was showing when the hold button was pressed will continue to be played in place of the presentation. To return to the edited cut the user depresses the hold button again. The hold button can be the "enter" button on a television remote control device, for example.

The "held" track will continue to play until the user decides to resume presentation of the edited cut track (also referred to as the "program") or until the held track ends. Upon ending, the program track is resumed. While holding a track the user is free to select other available tracks in addition to jumping back to the program track at any time.

Embodiments of the invention can be used regardless of the format of a source of track information. For example, a DVD, broadcast signal, digital network, hard disk, RAM, etc. can each serve, independently or in combination, as sources for one or more tracks of a presentation. In cases where the source format allows random access of content to a necessary degree, an edit decision list (EDL) is used to dictate the playback of content from different tracks to produce the program track. Where an EDL or other mechanism is used to play back portions of tracks in a predetermined sequence, an embodiment of the invention uses a control system that determines which track or track portion to display in response to a hold button selection.

One embodiment of the invention provides a method for selecting a video track during playback of a media presentation, wherein the media presentation includes a program track definition for displaying portions of first and second video tracks in a predetermined sequence, the method comprising: playing back the program track; accepting a signal from a user-input device to indicate a user selection; determining whether a portion of the program track playing at the time of accepting the user selection is the first or the second track; and playing back the determined track.

DETAILED DESCRIPTION OF THE INVENTION

Figure 1:
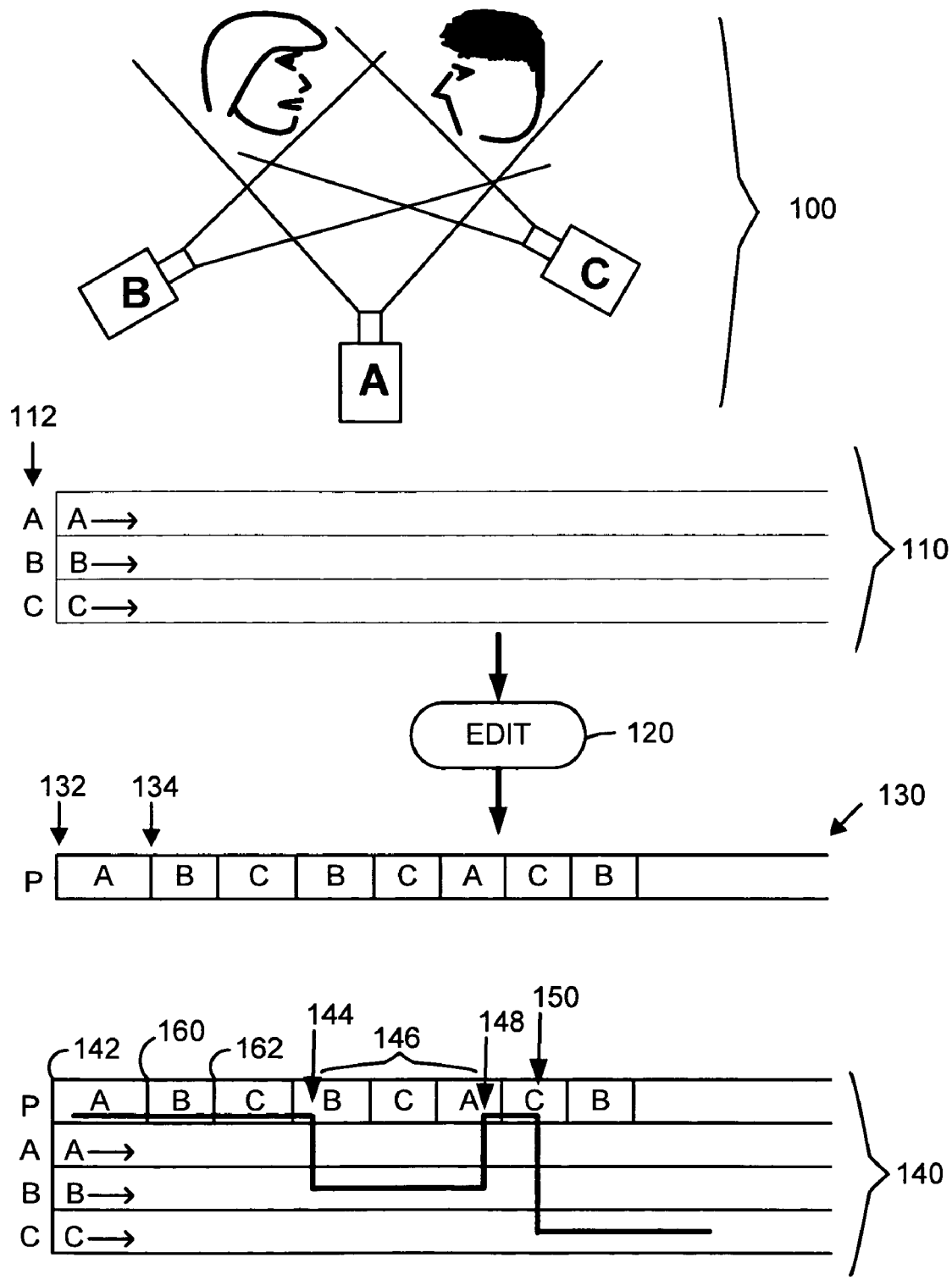
FIG. 1 illustrates basic steps in creating and presenting a multi-track production.

FIG. 1 illustrates basic steps in creating and presenting a multi-track production such as a multi-angle DVD. Note that FIG. 1 is greatly simplified for purposes of illustrating the invention. Further details of multi-track DVD production can be found in the co-pending patent application, cited above, and in publications such as *DVDs Demystified*, Second Edition, 2001 published by McGraw Hill; and in standards promulgated by the DVD Forum such as "DVD Video Specification 1.0"; the foregoing which are each incorporated by reference as if set forth in full in this document for all purposes.

In FIG. 1, an exemplary multi-camera scene is shot with three different cameras recording the action simultaneously as Camera A, Camera B and Camera C. In this case the scene is of two people, woman 102 and man 104, having a conversation. Camera A is a basic two-shot that includes both the woman and man in a side view. Camera B is a close-up angle of the man while Camera C is a close-up angle of the woman. In the example, we assume that these cameras are stationary and are used to record the entire scene. Naturally, other applications can use any number of cameras or other visual recording devices in any position including moving cameras. Other means of generating visual images can be used such as effects, filters or modifications to camera images, computer generated images, still images, 3D images, panoramic images, etc. In general, aspects of the invention can be used with any type of electronically captured or generated visual imagery (including real-time) that can be presented to a user.

Audio is also typically part of each camera's recorded track. Although today's movies usually add audio in post-production, each camera can record its own audio. The audio can be made different for each camera track as where Camera C's audio track has the woman's voice louder and/or processed to sound as if the view is closer to the woman. Similarly, track B's audio track can feature the man's voice whereas track A's audio can be balanced with respect to the two voices. In the discussion herein, it should be assumed that audio can be treated similarly with image information insofar as selecting and presenting the audio information when image information associated with the audio is selected and presented.

Audio can also be treated independently of image information. For example, instead of changing a video track when the hold button is depressed, only audio can change. In such a case tracks P, A, B and C can include different audio tracks with one or more of the tracks also being used to display video. When a track is selected that has only audio then whatever video track is currently playing will continue to play for purposes of visual images. However, the current audio will be replaced with the selected audio. This can allow, for example, a close-up of a drummer in a live band performance to be "held" and the result is that the drum audio track is selected so that the drum sounds are more predominant. Other applications are possible.

The recorded tracks from each camera are shown at 110. The track names are at 112 and the track content is shown within the track. Thus, the track named A includes the images from Camera A. Likewise, the tracks named B and C include images from Cameras B and C, respectively. The tracks shown at 110 are synchronized in time ("synced") so that images recorded at a point in time from any one camera can be used to determine the image recorded at another camera at that same point in time. This is illustrated by having the three tracks in locked horizontal positions with respect to each other.

At 120 an editing step is shown. At the editing step a human editor selects portions of tracks from each of the cameras and combines the tracks into a single program track. For ease of illustration, many post-production steps are also considered to be included in the editing step of FIG. 1. In general, any suitable method or system, including manual, automated or combinations of manual and automated steps can be used to achieve the program.

A result of the editing step is a program track, named P, shown at 130. The program track starts with angle A at the beginning of the program at 132. After a while the program tack cuts to angle B at point 134. At later times there are cuts to C, B, C, A, C, and B, in sequence as the program is played back.

At 140 a result of a DVD authoring step is shown. Tracks P, A, B, and C, are stored on a DVD in sync so that during playback a user can jump from track to track. User selection can be by any suitable means. A preferred embodiment uses a single button on a television remote control device. The button is normally labeled as the "enter" button on a remote control and is referred to as a "hold" button when used according to the track hold feature.

The line 142 shows path of displaying different tracks during program presentation. The program starts at the beginning at 142. The program track is the default starting track.

Assuming the user (or another event) does not cause an angle change, the program continues playing the edited cuts so that after track A plays for a while then track B is shown, followed by track C and then track B, again. However, during playback of track B, at time 144 the user presses the hold button which causes selection of track B. The mechanism for the playback device detecting selection of the hold function and determining which track to jump to is described below.

Since the user has chosen to hold track B, track B continues playing and the user does not see the remainder of track B in the program track. Note that in this case what the user sees on track B is identical to what the user is not seeing in track P after the hold operation. However, for other productions this need not always be the case. The user also does not see the cuts and portions of tracks C and A that are within the region 146.

At time 148 the user chooses to end the hold function, e.g., by depressing the enter key on the remote control again. The playback is returned to the current point in the program track which, at this time, is track A. Playback of track P continues through the cut to track C until the user again selects to hold the current track at time 150. In this case, since the currently displayed track is C, a branch or jump to track C occurs. The user can return to the program track at any time by again depressing the hold button.

Although the hold function has been described with respect to a DVD medium, any other source of multi-track content can be used. For example, video compact disc (CD), magnetic disk drives, RAM, multi-layer discs, etc., can be used. Other sources include analog or digital broadcast signals as from a radio-frequency transmission (e.g., ground stations, satellite, etc.), cable television, streamed or downloaded content from a digital network such as the Internet, etc. In general, any content source including image and/or audio content can be used.

Any suitable encoding format can be employed. The encoding format for video signals may be MPEG-2 or other, and the encoding format for audio signals may be Dolby AC-3, DTS, uncompressed PCM, or other. Any means of switching or selecting tracks or views can be adapted for use with the invention. For example, track switching such as that disclosed in the co-pending patent application, referenced above can be used.

In a DVD implementation, MPEG-2 video includes segments of video known as Groups of Pictures, (GOPs). Each GOP is generally 15 frames in length, and contains a set pattern of I (Intra) P (Predictive) and B (Bi-directional) frames. MPEG-2 uses inter-frame compression, which means that frames may rely on information stored in adjacent frames to create a complete picture. The only frames that are self-contained are Intra-frames. In order to avoid visible artifacts, multi-angle material must be encoded with closed GOPs. In each closed GOP, frames only refer to adjacent frames within their GOP. In contrast, in each open GOP, frames may refer to adjacent frames across GOP boundaries.

When multiple DVD video angles are present, they are multiplexed with audio data, subpicture data (containing button highlights) and navigational information (including button commands). None of this information is shared across angles, and each angle's data is interleaved within interleave units (ILWUs) within Video Object (VOB) files which provide the physical structure for the data stored on a DVD.

Each file contains a number of Navigation packs, which contain information about navigational information and sub-picture display options (button commands, highlight colors, etc.). Each Navigation pack containing a button command on the angle for which the command is to be changed must have the embedded command replaced by the desired command. This is done by locating the appropriate areas in the VOB file(s) and replacing the appropriate data. Care must be taken to avoid changing the amount of data in the VOB files, which may render them unusable.

In the example shown in FIG. 1, a first Navigation pack (or "Nav pack") is made active at, or shortly after, start time 142. This first Nav pack indicates that upon a press of the enter button on the remote control, the track to be selected is track A. Similarly, at time 160 a Nav pack designating track B is made active. At time 162 a Nav pack designating track C is made active, and so on. Details of using Nav packs for track switching in response to a user control activation can be found in the references cited at the beginning of this section.

A preferred embodiment of the invention implements the button command as a "hidden" button so that no visual representation of a button, or alternate selection, is displayed on the screen. Upon user depressing of the hold button, however, a visual indicator is briefly displayed so that the user is provided with feedback that a button press has been recognized by the system. In an actual implementation the visual indicator is a combination of text and graphics that is displayed for about one-half second that covers about half of the screen area. In other embodiments any other way of handling visual indicators, feedback indication, etc., can be acceptable.

A hidden button is a standard button for which the button selection highlight has been defined to be completely transparent. The visual indicator of button activation is referred to as an "activation highlight." As far as screen coverage or area, the activation highlight can be designed to cover the whole screen or only a portion of the screen. On DVDs the activation highlight typically appears for between ½ seconds and 2 seconds (depending on when the button is pressed) but in other formats the DVD author can have more control over the interval of appearance.

If the current track is the program track then the hold button is assigned to a Nav pack command that is updated every time there is a scene change so that the hold button is always assigned to the track corresponding to the current scene, or camera view. In a typical DVD the Nav packs are updated about every one-half second throughout each DVD track. The Nav pack can include button command assignments, menu display and function information. In the present discussion, where a button assignment is made with a Nav pack, it is assumed that a Nav pack occurs sufficiently close to the indicated time. In different embodiments, other mechanisms may be used to achieve button command assignments or other ways to allow track selection.

FIG. 1, at about time 142 the Nav pack associated with the program track is set to assign track A to the hold button so that when the hold button is pressed, track A is selected. At time 160 the hold button is assigned to select track B. At time 162 the hold button is assigned to select track C, and so on. On each of tracks A, B and C, Nav packs are set at frequent intervals (e.g., every one-half second) so that the hold button will act to select the program track. Note that other embodiments can use different ways to assign track selection to a hold button or other control.

Figure 2:
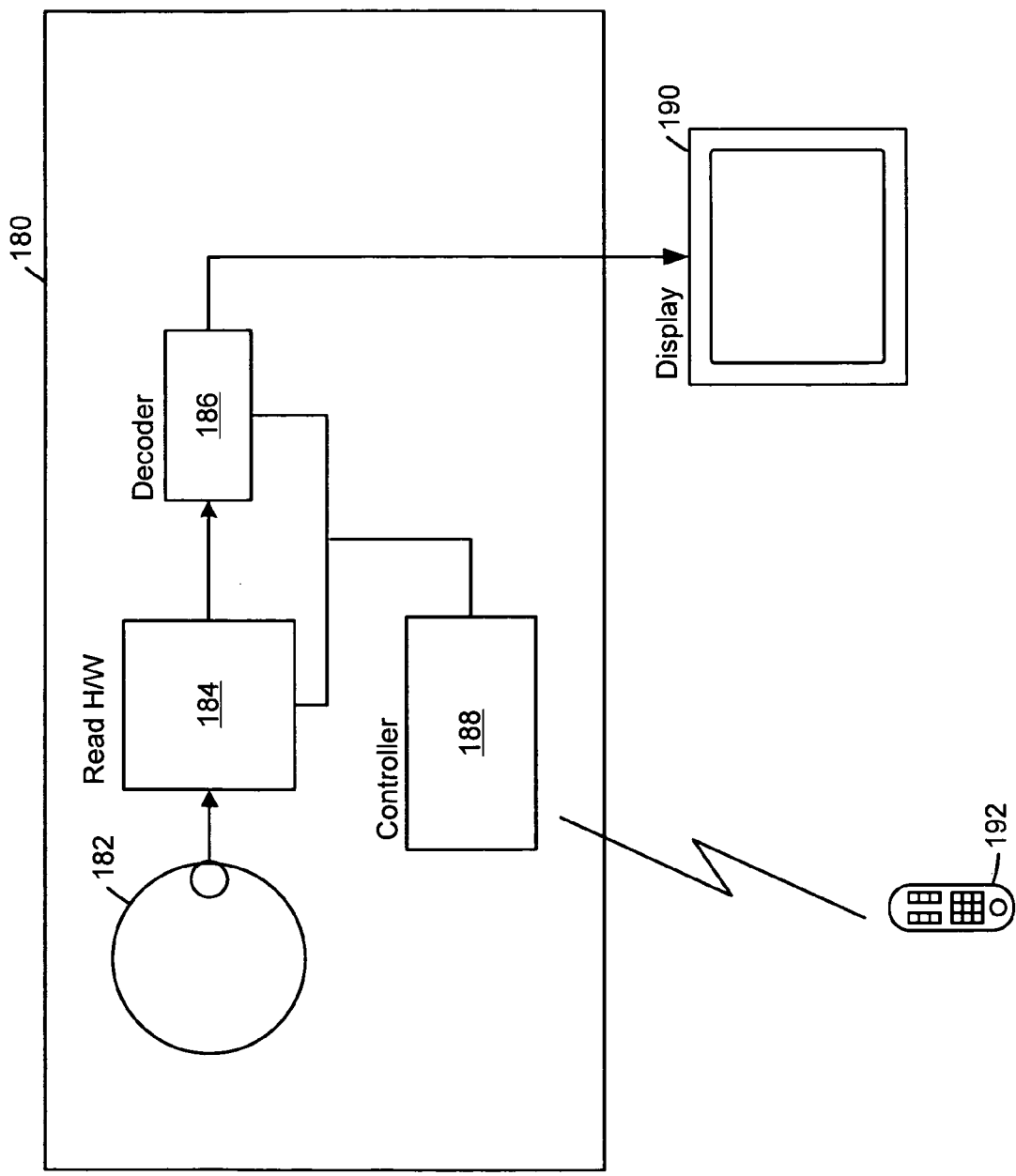
FIG. 2 shows an example of a basic playback device.

FIG. 2 provides an example of a basic playback device such as a DVD player, suitable for use with the present invention.

In FIG. 2, DVD player 180 includes a removable DVD disc 182 that is read by read hardware 184. Read hardware 184 scans the DVD disc to obtain track information such as that described above with respect to FIG. 1. Note that FIG. 1 is not necessarily representative of the actual layout of track information on the DVD. The DVD actual track information is arranged along a single concentric spiral of many tens of thousands of loops. Any suitable format or arrangement of track information on the DVD can be used. Decoder 186 acts to decode the DVD track information that is read from the disc. The decoded information is displayed on display 190.

Controller 188 controls the reading and displaying operations of read hardware 184 and decoder 186. Controller 188 can be microprocessor based to execute software, firmware, microcode or other instructions. Alternatively, controller 188 can use dedicated circuitry to achieve its functions. Any suitable design can be used. In a preferred embodiment, controller 188 is responsive to controls generated by user remote control device 192. In other applications any other type of user input device can be used to accept a user command. For example, a game console, voice recognition, personal digital assistant (PDA), laptop, personal computer, etc., can be used. Also, any suitable device other than a DVD player can be used to play back a presentation. For example, a personal computer, set-top box, media receiver, etc., can be used. In general, functions of the invention can be achieved by any device or devices equipped with suitable hardware, software or a combination of both. Although a preferred embodiment of the invention reacts to a human user's actions to cause selection of tracks, other implementations can use a signal generated automatically by a machine, or received from an external source such as the Internet, a broadcast signal, a signal on the DVD disc, or from another source.

Embodiments of the invention can be used regardless of the format of a source of track information. For example, a DVD, broadcast signal, digital network, hard disk, RAM, etc. can each serve, independently or in combination, as sources for one or more tracks of a presentation. In some cases, such as a DVD, the sequence of presentation of a program and the synchronization of the program with other tracks is partly inherent in the format. In other words, the sequencing of content presentation (i.e., frames in a portion of a track) is dictated largely by the order in which image information has been written to the DVD. Synchronization among tracks is partly due to the relative positions of the track portions or content on the DVD and is also due to synchronizing methods (e.g., pointers, blocks, groups and other data structures) used in the DVD format. In other applications, such as a hard disk drive or RAM, the content does not need to be resident in a sequenced order since the content can be essentially randomly accessed as desired.

"Linear" media such as a DVD, video CD, VHS tape, streaming or broadcast video, etc., can be used with EDL playback as long as there is a fast (preferably undetectable to the human eye) way to switch tracks. "Random Access" media such as a magnetic hard disk, RAM, etc., can also be used with an EDL as the physical locations of the different stored tracks do not create delays or other problems upon selection during playback.

Figure 3:
FIG. 3 illustrates an embodiment of the invention using an edit decision list.

FIG. 3 illustrates an embodiment of the invention that uses an EDL approach. In FIG. 3, EDL 200 includes entries that have an entry number, time and track. Each entry tells the controller at which time to select a track segment in order to reproduce the program of FIG. 1. For example, at time zero (i.e., the start of playing of the program) track A is selected. Track A is played back starting from the selection time which is, for this first entry, time zero or the start of track A.

Next, at time 8.0, 8 seconds and 0 tenths of seconds after playing has commenced, track B is selected. Track B's contents are displayed starting from 8.0 second into track B. Similarly, track C is selected at time 10.5; track B is selected at time 13.5 and so on. Thus, the program described in FIG. 1 is shown reproduced by using an EDL so that a separate pre-recorded track of sequenced other tracks is not required.

In the EDL approach of FIG. 3, the controller keeps track of the current track selection by using, e.g., a register that is updated whenever a selection is made. At a time of detecting a user pressing the hold button, the controller can look up the current track in the program EDL and branch to that track at the current time into the target track. Another approach is for the controller to look up the last selection made prior to the time of user depressing the hold button. For example, if the user presses the hold button 17 seconds into the program, the controller can parse down the EDL entries until a time greater than 17 seconds is encountered. In the example of FIG. 3, entry 6 at 20.0 seconds is the first entry with a selection time greater than 17 seconds. This means that entry 5 was the last selection so that the track to branch to is track A.

The EDL can be implemented in many different ways and the associated processing for the controller can be designed accordingly. For example, an EDL might use a pointer to an address within a track so that jumping to the right time in a target track does not have to be computed. An EDL can use "in/out" points or pointers in addition to, or in place of, time markers. Other EDL arrangements are possible.

Multiple EDLs can be used to implement multiple tracks. For example, any of the tracks P, A, B or C of FIG. 1 can be defined with an EDL or other type of data structure that is used to define a sequence of images. In some embodiments a user's selections of tracks can be used to create and store an EDL for later playback. EDLs can be supplied on a DVD, obtained over a digital network, or can be obtained or created in different ways. A predefined EDL can be modified by a user as where a user elects to hold scenes and the held scenes become part of an EDL that includes the original cuts and the held scenes (which can override some of the original cuts). A new EDL can be loaded partway through a program. An EDL can be used in combination with an edited cut.

One approach to using an EDL is to overlay a menu on the video presentation at each edit point on the EDL and use a conditional command to force an angle change at that point. In DVD-Video one way to achieve this is to use an auto-activated button. For other formats other approaches can be used such as using a script which can change angles or streams at specific timecodes. Future formats such as Blu-Ray, HD-DVD, etc., may provide specific mechanisms that allow more efficient implementations of track selections than are described herein. For example, it may not be necessary to refresh menus in Blu-Ray formats.

Between all of the pre-determined menus with auto-activated buttons are menus with user-activated buttons. These can be used for the hold function. Instead of triggering an angle change, however, they can be used to tell the next pre-determined edit point whether to change tracks or to hold the current track. One way to implement this is to have activation of one of these buttons toggle a flag (such as one of 16 general parameter registers available in DVD-Video players) to indicate whether the auto-activated button should change the angle or not. For instance, if general purpose register GPRM1=0, then the angle would be changed. If GPRM1=1, the angle change command wouldn't execute, and hence the current angle would remain visible. Each time the button is pressed, the register switches 0 to 1, or 1 to 0.

Trying to implement some of the EDL features described herein can be complex or not efficient with the functionality provided by today's playback systems. For example, using one of multiple EDLs is complicated in a player that only allows one command assigned per button and a limited number of registers. However, playback systems with other designs (including future designs) can make implementation of multiple EDLs more efficient. For example, a system could allow an application to run concurrently with the video. The application can use the EDL to trigger track or stream changes. On DVD-Video, the application logic may need to run often (e.g., every ½ second) to check if the register assigned to that particular time had a flag to set to a certain track or view. Presently, there are not enough registers in common players to do more than a short program, even with economical bit techniques such as bitshifting to allow each register to be used as multiple 1-bit registers. Some playback devices such as computer systems can allow application execution while a DVD player may not.

To record an EDL, the application can look for user input and note the time at which a particular stream is selected. This could be done by holding sources while watching a player-generated edit, or by use of a visual interface of a matrix showing all available angles for user selection. When in record mode, the application notes the selection made on the interface. This matrix could be a separate pre-composited angle or created by the playback device as a composite of existing angles, and might be displayed separate to other angles or as a picture-in-picture or overlay. Other interface options are possible.

To attempt to standardize playback across many players, a calibration procedure can be used. With DVD-Video, a system register indicates the current track being played. But this register is of limited utility as it doesn't always correspond to the angle being displayed. For example, if the player is instructed to switch to track B, the system register will immediately change to indicate track B, but the displayed track may not change for a second or two. A player that has a system register that accurately indicates the currently playing track can use the accurate register to change in sync with the display. The accurate register can be used, along with a navigation timer, to calibrate playback.

The calibration routine can run once per session, perhaps on disc insert or before the program is played for the first time. It can include a test program with similar characteristics (number of tracks and audio streams, along with encoding bitrates) or a short piece of the multiangle program. An auto-activated button can be used to start both the player's navigation timer and to change playback tracks (where multiple commands per button are allowed) and a concurrent monitor application will watch for the system register to indicate when the requested angle is displayed. When that happens, the navigation timer is stopped. Its value is then subtracted from each time in created EDLs so that the angle change commands for playback are given at the right offset so that the display of the angle occurs at the desired point.

If it's not possible or desirable to run an application (for instance in players of limited advanced functionality), one can calibrate via user feedback. Instead of an auto-activated button, a user-activated button is used during playback of the calibration program. First press starts the timer and issues the angle change command. The user is asked to press enter again when the new angle is displayed. That second press stops the timer and the program, and the resulting timer value is used as the subtracted offset.

Although the invention has been discussed primarily with respect to specific embodiments, other embodiments are possible and are within the scope of the invention. For example, although it is contemplated that selectable tracks are synchronized in time with a program track so that a same scene or view can be maintained, other embodiments can cause selection of tracks that provide a view taken at a different time, from a different camera or angle or that use any other type of content.

For example, the hold button can be designated as a "buy" button where depressing the button causes the program to display buyer's information about apparel that is being worn by actors in the program. This can be achieved by placing text to overlay the alternate track (e.g., tracks A, B, and C of FIG. 1) that provides a price, garment information (e.g., garment name, designer name), store name and location, web site, etc.

Successive presses of a button need not only cycle between the program track and another track. For example, when viewing the program track a first button press can cause track A to be selected. A second button press causes track B to be presented and a third button press causes track C to be selected. Pressing the button again can return the user to the program track. Other variations of track selection are possible. (multiple buttons can have multiple purposes, 1 button to cycle, 2 arrow buttons to switch between available alternate tracks sequentially 1 goes right and 1 goes left.)

The term "process" is intended to include components such as hardware, software or a combination of both used to achieve a function. Portions of the function can be performed by multiple, physically or geographically separate components. Also, portions of the function can be performed at different times by one or more components.

Although embodiments of the invention are described as manipulating, or using, a "navigation pack," any type of data, data structure, object, type or collection of information may be employed. Other mechanisms may become available to control selection of video segments, tracks, streams or other visual or audio information as the standards or industry practices change. Similarly, the use of the term "object file" is intended to mean any type of file or other collection of data.

In general, any type of playback device, or devices, e.g., computers, consumer electronic devices, digital processor-based devices, and custom circuitry, can be used for transmission of data, playback, execution of a viewer interface and to perform any of the functions and features described herein. Processing can be performed at any physical location and can be done by a single processing unit, or in a co-processing or parallel arrangement with multiple processors. Further, although time codes for messages have been described, any other types of time indications that associate the messages to points in time of an audiovisual production may be used.

Any suitable programming language can be used to implement the routines of the present invention including C, C++, Java, assembly language, etc. Different programming techniques can be employed such as procedural or object oriented. The routines can execute on a single processing device or multiple processors. Although the steps, operations or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software or a combination of both. Unless otherwise stated, functions may also be performed manually, in whole or in part.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

A "processor" or "process" includes any hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method of controlling video playback of a video presentation stored on a removable non-transitory optical medium:
    playing back the video media presentation via a playback device, the video media presentation including a first predefined sequence of frames shot using a plurality of camera angles, including a frame shot at a first angle;
    during playback of the video media presentation, wherein the video media presentation is displayed at a first screen location, receiving at the playback device a hold instruction while the frame shot at the first angle is being displayed at the first screen location;
    associating the hold instruction received while the frame shot at the first angle is being displayed with the first angle; and
    responsive to the hold instruction, providing uninterrupted continuous display via the playback device of a sequence of frames shot at the first angle at the first screen location instead of continuing to playback the first predefined sequence of frames at the first screen location.

2. The method as defined in claim 1, wherein the video media presentation is defined by an edit decision list including entries that have an entry number, time and track.

3. The method as defined in claim 1, wherein the hold instruction is provided by a user activating a single button on a remote control.

4. The method as defined in claim 1, the method further comprising updating a Navigation pack command assigned to a hold control when there is a scene change.

5. The method as defined in claim 1, wherein playback of the first predefined sequence of frames is automatically resumed.

6. The method as defined claim 1, the method further comprising, in response to a user instruction, resuming playback of the first predefined sequence of frames at a location in the first predefined sequence of frames as if the first predefined sequence of frames had continued playing instead of the sequence of frames shot at the first angle.

7. The method defined in claim 6, wherein the hold instruction is provided by a user activating a hold button, and the user instruction to resume playback of the first predefined sequence of frames is provided by the user activating the same hold button again.

8. The method defined in claim 6, wherein the hold instruction is provided by a user activating a hold button while no visual representation of a button or alternate selection is displayed to the user.

9. A tangible non-transitory computer-readable medium having computer-executable instructions stored thereon that, if executed by a computing device, cause the computing device to perform operations of controlling video playback of a video presentation stored on a removable non-transitory optical medium comprising:
    during playback by a playback device of the video media presentation having a first predefined sequence of frames shot using a plurality of camera angles including a frame shot at a first angle, wherein the video media presentation is displayed at a first screen location,
    receiving at the playback device a hold instruction while the frame shot at the first angle is being displayed at the first location;
    associating the hold instruction received while the frame shot at the first angle is being displayed with the first angle at the first location; and
    responsive to the hold instruction, providing via the playback device uninterrupted continuous display of a sequence of frames shot at the first angle at the first location instead of continuing to playback the first predefined sequence of frames.

10. The tangible computer-readable medium as defined in claim 9, wherein the video media presentation is defined by an edit decision list including entries that have an entry number, time and track.

11. The tangible computer-readable medium as defined in claim 9, the operations further comprising updating a Navigation pack command assigned to a hold control when there is a scene change.

12. The tangible computer-readable medium as defined claim 9, the operations further comprising, in response to a user instruction, resuming playback of the first predefined sequence of frames at a location in the first predefined sequence of frames as if the first predefined sequence of frames had continued playing instead of the sequence of frames shot at the first angle.

13. The tangible computer-readable medium defined in claim 9, wherein the hold instruction is provided by a user activating a hold button, and the user instruction to resume playback of the first predefined sequence of frames is provided by the user activating the same hold button again.

14. The tangible computer-readable medium defined in claim 9, wherein the hold instruction is provided by a user activating a hold button while no visual representation of a button or alternate selection is displayed to the user by the playback device.

15. An apparatus for controlling a video presentation stored on a removable non-transitory optical medium, the apparatus comprising:
   a processor, including hardware;
   tangible computer-readable medium having processor-executable instructions stored thereon that, if executed by processor, cause the processor to perform operations comprising:
      during playback by a playback device of the video media presentation having a first predefined sequence of frames shot using a plurality of camera angles including a frame shot at a first angle, wherein the video media presentation is displayed at a first screen location,
      receiving at the playback device a hold instruction while the frame shot at the first angle is being displayed at the first screen location;
      associating the hold instruction received while the frame shot at the first angle is being displayed with the first angle at the first screen location; and
      responsive to the hold instruction, providing via the playback device uninterrupted continuous display of a sequence of frames shot at the first angle at the first screen location instead of continuing to playback the first predefined sequence of frames at the first screen location.

16. The apparatus as defined in claim 15, wherein the video media presentation is defined by an edit decision list including entries that have an entry number, time and track.

17. The apparatus as defined in claim 15, the operations further comprising updating a Navigation pack command assigned to a hold control when there is a scene change.

18. The apparatus as defined claim 15, the operations further comprising, in response to a user instruction, resuming playback of the first predefined sequence of frames at a location in the first predefined sequence of frames as if the first predefined sequence of frames had continued playing instead of the sequence of frames shot at the first angle.

19. The apparatus defined in claim 15, wherein the hold instruction is provided by a user activating a hold button, and the user instruction to resume playback of the first predefined sequence of frames is provided by the user activating the same hold button again.

20. The apparatus defined in claim 15, wherein the hold instruction is provided by a user activating a hold button while no visual representation of a button or alternate selection is displayed to the user by the playback device.

* * * * *

UNITED STATES PATENT AND TRADEMARK OFFICE
CERTIFICATE OF CORRECTION

| | | |
|---|---|---|
| PATENT NO. | : 8,045,845 B2 | |
| APPLICATION NO. | : 11/029028 | |
| DATED | : October 25, 2011 | |
| INVENTOR(S) | : Braun et al. | |

It is certified that error appears in the above-identified patent and that said Letters Patent is hereby corrected as shown below:

Column 12, line 7, in Claim 6, delete "The method as defined claim 1," and insert -- The method as defined in claim 1, --.

Column 12, line 14, in Claim 7, delete "The method defined in claim 6," and insert -- The method as defined in claim 6, --.

Column 12, line 19, in Claim 8, delete "The method defined in claim 6," and insert -- The method as defined in claim 6, --.

Column 12, lines 54-55, in Claim 12, delete "The tangible computer-readable medium as defined claim 9," and insert -- The tangible computer-readable medium as defined in claim 9, --.

Column 12, lines 61-62, in Claim 13, delete "The tangible computer-readable medium defined in claim 9," and insert -- The tangible computer-readable medium as defined in claim 9, --.

Column 12, lines 66-67, in Claim 14, delete "The tangible computer-readable medium defined in claim 9," and insert -- The tangible computer-readable medium as defined in claim 9, --.

Column 14, line 10, in Claim 18, delete "The apparatus as defined claim 15," and insert -- The apparatus as defined in claim 15, --.

Column 14, line 16, in Claim 19, delete "The apparatus defined in claim 15," and insert -- The apparatus as defined in claim 15, --.

Column 14, line 21, in Claim 20, delete "The apparatus defined in claim 15," and insert -- The apparatus as defined in claim 15, --.

Signed and Sealed this
Twenty-ninth Day of May, 2012

David J. Kappos
*Director of the United States Patent and Trademark Office*